Figure 1:
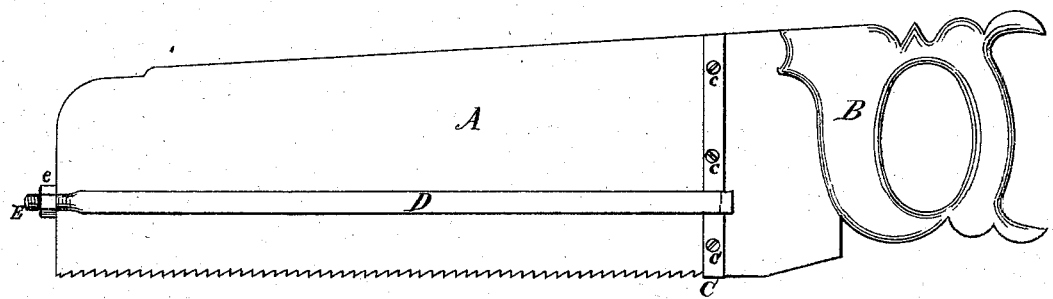
Figure 2:

G. W. KIRBY.
Saw-Gages.

No. 144,209.

Patented Nov. 4, 1873.

Witnesses:

Inventor:

UNITED STATES PATENT OFFICE.

GEORGE W. KIRBY, OF DETROIT, MICHIGAN.

IMPROVEMENT IN SAW-GAGES.

Specification forming part of Letters Patent No. 144,209, dated November 4, 1873; application filed June 24, 1873.

*To all whom it may concern:*

Be it known that I, GEORGE W. KIRBY, of Detroit, Wayne county, Michigan, have invented a new and useful Improvement in Saw-Gages, of which the following is a specification, reference being had to the accompanying drawings.

My invention relates to gage-saws; and it consists in a novel construction and arrangement of a pair of gage-bars, united at one end, and provided with screw-thread and a nut, and provided at the other end with dovetailed grooves, wherewith they fit on a pair of dovetailed rods fastened near the saw-handle, across the saw-plate, at a right angle to the line of the saw-teeth, so that the said gage-bars are fastened between the dovetailed cross-bars and the front end of the saw, when the nut is made to bear against the said front end. The object of my invention is to provide a saw with a gage which may be easily and quickly set, which is strong and reliable, without adding much to the thickness or to the weight of the saw, and which does not warp the saw as other appliances of that class are wont to do, the application of which to a saw does not serve to weaken it, as only two or three very small holes in the saw suffice for the purpose.

In the accompanying drawings, A represents a saw with a handle, B, attached to it. Near the handle B, across the saw, on either side, a bar, C, is fastened in the following manner: The two bars used are dovetailed on one side, which side is turned toward the saw-handle. The bars are so laid on the saw as to cover each other; then a number of holes are drilled through the bars C and the saw A, those on one of the bars being countersunk for the reception of screw-heads c, and the other of the bars, C, being provided with screw-threads to receive the threaded ends of the said screws. When the screws are inserted into the bars and saw-plate, they are drawn tight, and the bars are clamped rigidly to the saw, after which the screw heads and ends are carefully filed flush with the bars C. Two flat bars, D, are welded together at one end, and provided with a screw-thread, E, on which a nut, e, is screwed. The other end of each bar has a slot, F, of such shape as to fit nicely over one of the cross-bars C.

When the saw is to be used as a gage-saw, the bars D are slipped over the back of the saw, so that their grooves fit over the bars C. When the bars D indicate the right depth on the saw, the nut e is drawn tight against the front end of the saw, thereby drawing them also tight against the saw, by means of their dovetailed grooves. The saw is then ready for use.

Having thus described my invention, what I claim as new, and desire to secure by Letters Patent, is—

The arrangement of the bars D, constructed with the threaded end E and dovetailed grooves F, cross-bar C, and nut e, substantially as shown and described.

In testimony that I claim the foregoing improvement in saw-sets, as above described, I have hereunto set my hand and seal.

GEO. W. KIRBY. [L. S.]

Witnesses:
 MARCUS A. CHASE,
 GEORGE BOULEN.